United States Patent
Lewis

(10) Patent No.: US 9,369,725 B1
(45) Date of Patent: Jun. 14, 2016

(54) METHOD OF EFFICIENTLY IMPLEMENTING A MPEG-4 AVC DEBLOCKING FILTER ON AN ARRAY OF PARALLEL PROCESSORS

(71) Applicant: Amazon Technologies, Inc., Reno, NV (US)

(72) Inventor: Brian G. Lewis, Portland, OR (US)

(73) Assignee: Amazon Technologies, Inc., Reno, NV (US)

( * ) Notice: Subject to any disclaimer, the term of this patent is extended or adjusted under 35 U.S.C. 154(b) by 738 days.

(21) Appl. No.: 13/656,877

(22) Filed: Oct. 22, 2012

Related U.S. Application Data

(63) Continuation of application No. 12/342,229, filed on Dec. 23, 2008, now Pat. No. 8,295,360.

(51) Int. Cl.
*H04N 19/436* (2014.01)
*H04N 19/42* (2014.01)

(52) U.S. Cl.
CPC ........... *H04N 19/436* (2014.11); *H04N 19/439* (2014.11)

(58) Field of Classification Search
None
See application file for complete search history.

(56) References Cited

U.S. PATENT DOCUMENTS

| | | | |
|---|---|---|---|
| 7,584,342 B1 | 9/2009 | Nordquist et al. | 712/22 |
| 7,636,490 B2 | 12/2009 | Li | 382/268 |
| 8,116,379 B2 | 2/2012 | Dang | 375/240.24 |
| 2004/0247034 A1* | 12/2004 | Zhong | H04N 19/42 375/240.29 |
| 2005/0259744 A1 | 11/2005 | Hellman | 375/240.24 |
| 2006/0078052 A1* | 4/2006 | Dang | 375/240.24 |
| 2006/0133504 A1* | 6/2006 | Jung | H04N 19/61 375/240.16 |
| 2007/0171975 A1 | 7/2007 | Smith et al. | 375/240.13 |
| 2008/0117980 A1* | 5/2008 | Hung et al. | 375/240.24 |
| 2008/0123750 A1* | 5/2008 | Bronstein et al. | 375/240.24 |
| 2009/0002379 A1 | 1/2009 | Baeza et al. | 345/522 |

* cited by examiner

*Primary Examiner* — Kevin McInnish
(74) *Attorney, Agent, or Firm* — Hogan Lovells US LLP

(57) ABSTRACT

A method for implementing a deblocking filter including the steps of (A) reading pixel values for a plurality of macroblocks of an unfiltered video frame from an input buffer into a working buffer, where the working buffer has dimensions determined by a predefined input region of the deblocking filter and a portion of the working buffer forms a filter output region of the deblocking filter, (B) sequentially processing the pixel values in the working buffer through a plurality of filter processing stages using an array of software-configurable general purpose parallel processors, where each of the plurality of filter processing stages operates on a respective set of the pixel values in the working buffer, and (C) writing filtered pixel values from the filter output region of the working buffer to an output buffer after the plurality of filter processing stages are completed.

16 Claims, 6 Drawing Sheets

METHOD OF EFFICIENTLY IMPLEMENTING A MPEG-4 AVC DEBLOCKING FILTER ON AN ARRAY OF PARALLEL PROCESSORS

This is a continuation of U.S. Ser. No. 12/342,229, filed Dec. 23, 2008, which is incorporated by reference.

FIELD OF THE INVENTION

The present invention relates to video compression generally and, more particularly, to a method and/or architecture for efficiently implementing a MPEG-4 AVC deblocking filter on an array of parallel processors.

BACKGROUND OF THE INVENTION

Referring to FIG. 1, a diagram is shown illustrating divisions of a video frame 10 in accordance with the MPEG-4 part 10 advanced video coding (AVC) standard. The MPEG-4 part 10 standard defines a method for video compression that operates on rectangular groups of pixels. The type of compression performed by the MPEG-4 part 10 AVC standard is generally referred to as "block-based" compression. Each frame 10 of video is divided into a number of macroblocks 12. Each of the macroblocks 12 is further divided into transform blocks 14. The transform blocks 14 can also be referred to as sub-blocks.

As part of the video compression process, a prediction for the pixels in each macroblock 12 is generated based upon either (i) pixels from adjacent macroblocks 12 in the same frame 10 or (ii) pixels from previous frames in the video sequence. Differences between the prediction and the actual pixel values for the macroblock 12 are referred to as residual values (or just residuals). The residual values for each transform block 14 are converted from spatial-domain to frequency-domain coefficients. The frequency-domain coefficients are then divided down to reduce the range of values needed to represent the frequency-domain coefficients through a process known as quantization. Quantization allows much higher compression ratios, but at the cost of discarding information about the original video sequence. Once the data has been quantized, the frames of the original sequence can no longer be reconstructed exactly.

The quantized coefficients and a description of how to generate the macroblock prediction pixel values constitute the compressed video stream. When video frames are reconstructed from the compressed stream, the compression sequence is reversed. The coefficients for each transform block 14 are converted back to spatial residuals. A prediction for each macroblock is generated based on the description in the stream and added to the residuals to reconstruct the pixels for the macroblock. Because of the information lost in quantization, however, the reconstructed pixels differ from the original ones. One of the goals of video compression is to minimize the perceived differences as much as possible for a given compression ratio.

In block-based video compression the differences in the reconstructed images tend to be most obvious at the edges of the macroblocks 12 and the transform blocks 14. Because the blocks are compressed and reconstructed separately, errors tend to accumulate differently on each side of block boundaries and can produce a noticeable seam. To counteract the production of a noticeable seam, the MPEG-4 part 10 video compression standard includes a deblocking filter.

A definition of the deblocking filter can be found in Section 8.7 of the MPEG-4 part 10 video compression standard. The deblocking filter blends pixel values across macroblock and transform block edges in the reconstructed frames to reduce the discontinuities that result from quantization. Filtering takes place as part of both the compression and decompression processes. Filtering is performed after the video frames are reconstructed, but before the reconstructed frames are used to predict macroblocks in other frames. Because filtered frames are used for prediction, the filtering process must be exactly the same during compression and decompression or errors will accumulate in the decompressed video frames.

The definition of the deblocking filter in the MPEG-4 part 10 specification specifies that macroblocks are filtered in raster order (i.e., from left to right and top to bottom of the video frame). Because the macroblocks are filtered in raster order, the inputs to the deblocking filter include pixels that were already filtered as part of a previous macroblock. The inclusion of already filtered pixels as inputs to the deblocking filter implies sequential processing of the macroblocks in a frame in the specified raster order. The MPEG-4 part 10 deblocking filter improves both the perceived quality of the reconstructed image and the compression ratio, but requires additional processing. When performed sequentially, the deblocking filter processing can significantly increase the time required to encode and decode each frame.

It would be desirable to filter an arbitrary number of macroblock-size areas in a single video frame at the same time to reduce the time required to filter the frame.

SUMMARY OF THE INVENTION

The present invention concerns a method for implementing a deblocking filter comprising the steps of (A) reading pixel values for a plurality of macroblocks of an unfiltered video frame from an input buffer into a working buffer, where the working buffer has dimensions determined by a predefined input region of the deblocking filter and a portion of the working buffer forms a filter output region of the deblocking filter, (B) sequentially processing the pixel values in the working buffer through a plurality of filter processing stages using an array of software-configurable general purpose parallel processors, where each of the plurality of filter processing stages operates on a respective set of the pixel values in the working buffer, and (C) writing filtered pixel values from the filter output region of the working buffer to an output buffer after the plurality of filter processing stages are completed.

The objects, features and advantages of the present invention include providing a method and/or architecture for efficiently implementing a MPEG-4 AVC deblocking filter on an array of parallel processors that may (i) use multiple processors to filter an arbitrary number of macroblock-size areas in a single video frame at the same time, (ii) reduce the time taken to filter a frame, (iii) utilize separate storage buffers for unfiltered and filtered video frames, (iv) utilize a sequence of stages to generate output pixel values, (v) alternate between filtering across vertical edges and filtering across horizontal edges, (vi) process multiple columns of pixels at the same time when filtering across horizontal edges, and/or (vii) process multiple rows of pixels at the same time when filtering across vertical edges.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

In an example embodiment of the present invention, multiple processors may be used to filter an arbitrary number of macroblock-size areas in a single video frame at the same time. For example, deblocking filter logic as specified in ISO/IEC 14496-(MPEG-4 part 10—Advanced Video Coding) may be implemented using parallel processors. The use of parallel processors allows simultaneous processing of all pixel blocks in a video frame. The use of multiple processors may reduce the amount of time taken to filter the frame in proportion to the number of processors used. Examples of systems in which a filter in accordance with an embodiment of the present invention may be implemented can be found in co-pending non-provisional U.S. patent applications: U.S. Ser. No. 12/342,145, entitled "Video Encoder Using GPU," filed Dec. 23, 2008, U.S. Ser. No. 12/058,636, entitled "Video Encoding and Decoding Using Parallel Processors," filed Mar. 28, 2008, now U.S. Pat. No. 8,121,197; U.S. Ser. No. 12/189,735, entitled "A Method For Efficiently Executing Video Encoding Operations On Stream Processor Architectures," filed Aug. 11, 2008; each of which is herein incorporated by reference in their entirety.

Figure 1:
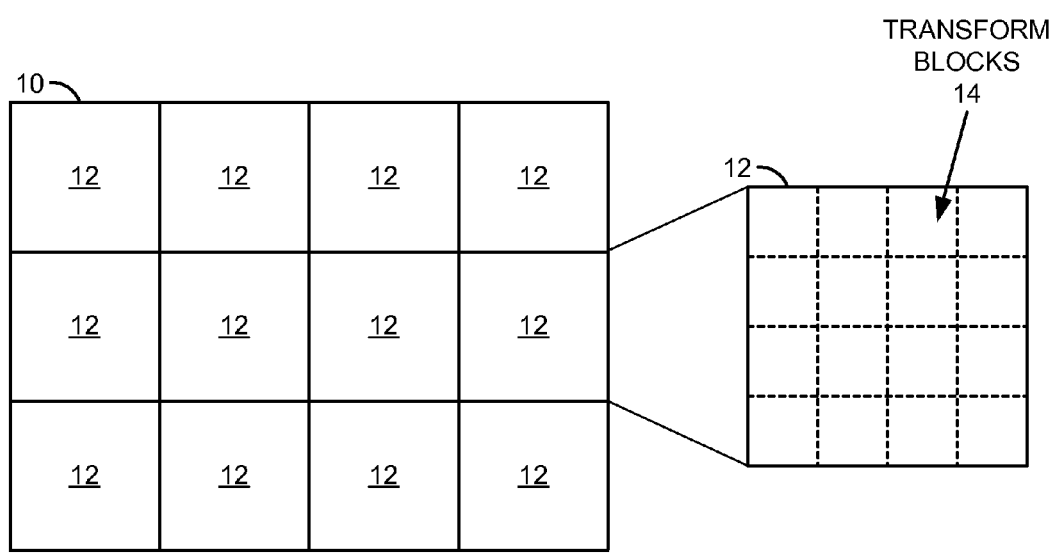
FIG. 1 is a diagram illustrating division of a video frame into macroblocks and transform blocks.
Figure 2:
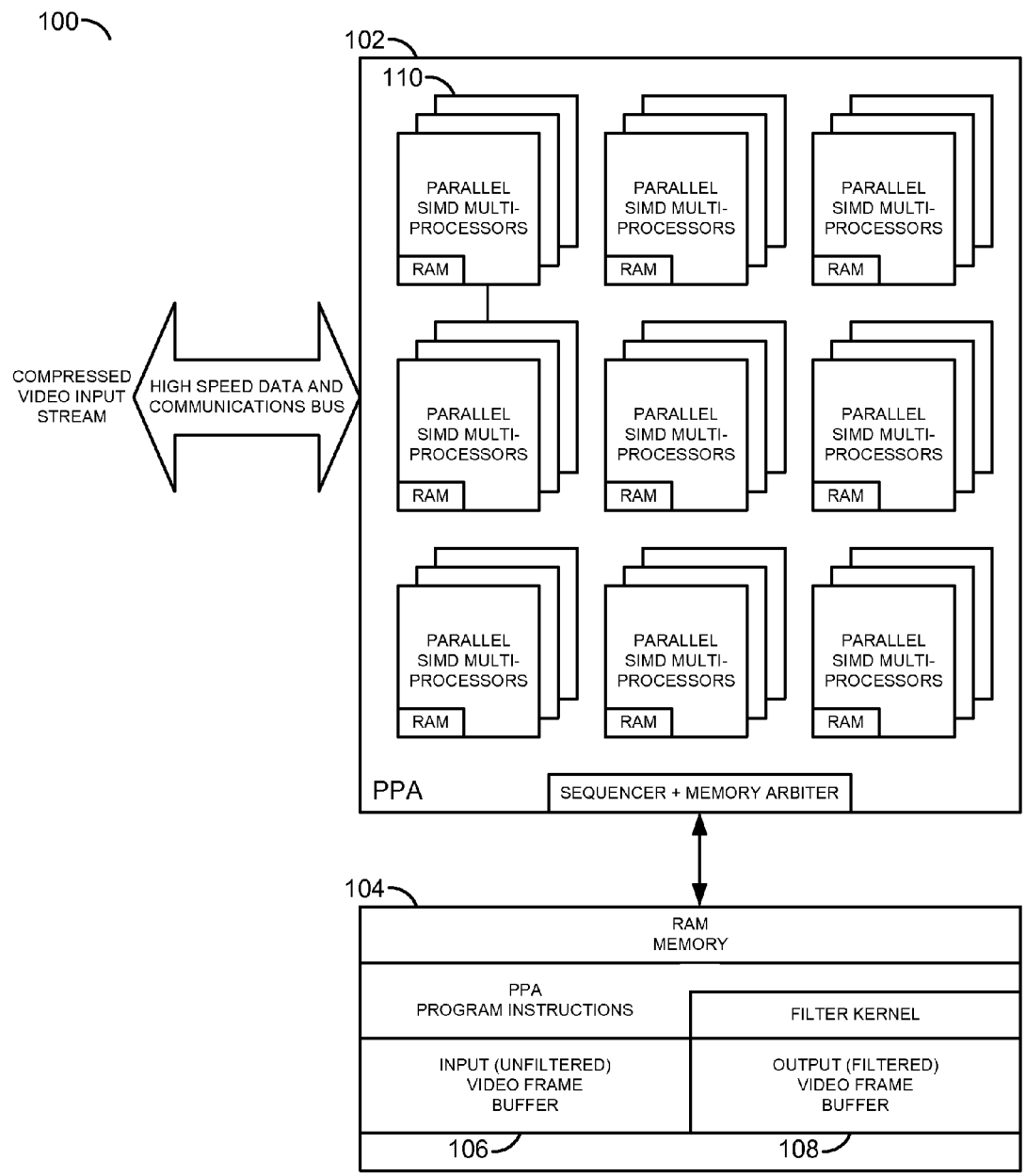
FIG. 2 is a diagram illustrating an array of parallel processors on which a filter in accordance with an example embodiment of the present invention may be implemented.

Referring to FIG. 2, a diagram is shown illustrating a system in accordance with an example embodiment of the present invention. In one example, separate storage buffers may be utilized for input (unfiltered) and output (filtered) video frames. For example, an architecture 100 in accordance with an example embodiment of the present invention may comprise a parallel processor array (PPA) 102 and storage medium 104. The storage medium 104 may contain an input buffer 106 and an output buffer 108. The parallel processor array 102 may comprise, in one example, a plurality of single instruction multiple data (SIMD) processors 110. The plurality of SIMD processors 110 may be configured to perform deblocking filter processing on a video frame using a filter kernel. A set of program instructions for the parallel processor array 102 may be referred to as a kernel. In one example, the filter kernel may implement a deblocking filter that is compliant with the MPEG-4 part 10 AVC standard using the parallel processor array 102. In one example, the plurality of SIMD processors 110 may read unfiltered pixels from the input buffer 106 and write filtered pixels to the output buffer 108.

Figure 3:
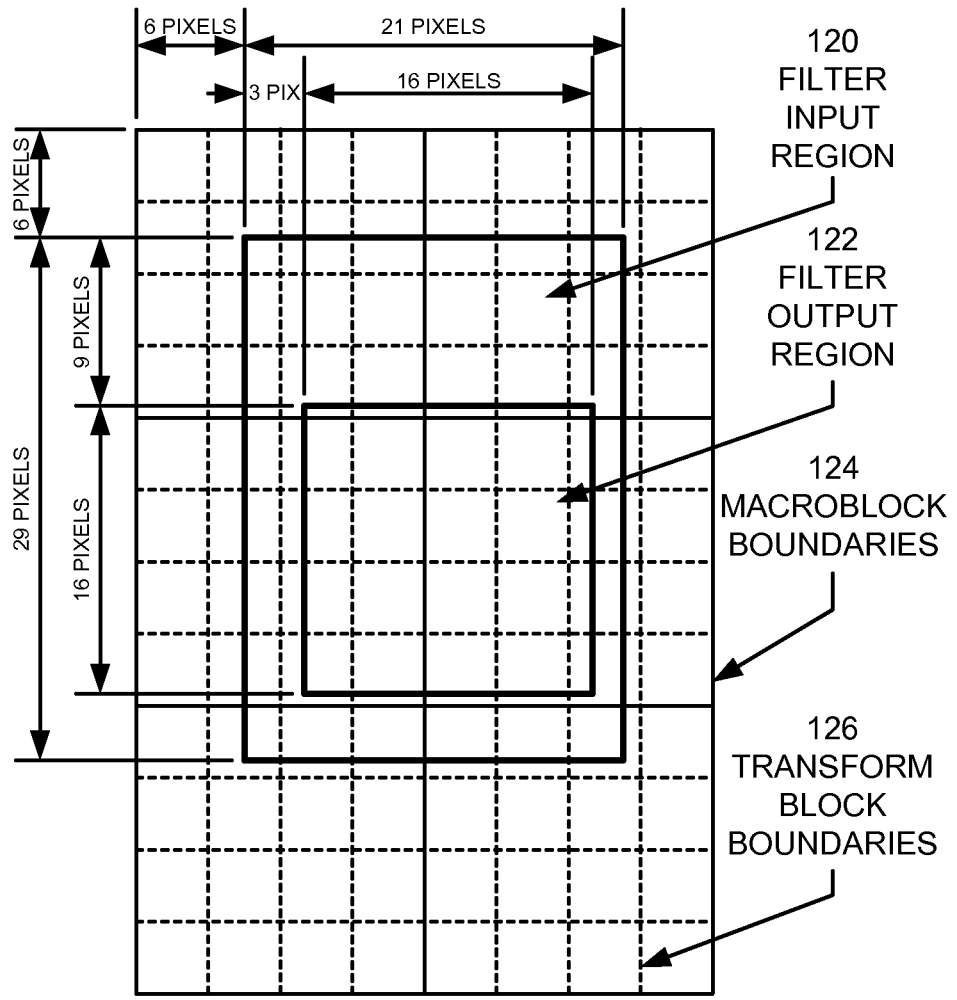
FIG. 3 is a diagram illustrating filter input and output regions in accordance with an example embodiment of the present invention.

Referring to FIG. 3, a diagram is shown illustrating example filter input and output regions in accordance with an example of an embodiment of the present invention. A minimum portion of a video frame that may be filtered separately from and in parallel with the remainder of the video frame may be referred to as a filter region. The minimum filterable region is the smallest region that can be filtered independently of the rest of the video frame. In one example, the minimum filterable region may be the size of a single macroblock. However, specific implementations may be configured to filter larger regions, provided the larger regions contain integer numbers of the minimum filterable region. For example, the example illustrated in FIG. 3 uses filter regions that are 3 times as high and wide as the minimum filter region. Input pixels for each filter region may be read from a filter input region 120 of the input buffer 106. Corresponding output pixels for the filtered area may be written to a filter output region 122 within the output buffer 108. Macroblock boundaries 124 (thinner solid lines) and transform block boundaries 126 (dotted lines) are shown for reference.

The dimensions of the filter input region 120 and the filter output region 122 are shown relative to an upper-left macroblock. In one example, the filter input region 120 may have dimensions of 21 horizontal pixels by 29 vertical pixels. An upper left corner of the filter input region 120 may be six pixels down and six pixels right of an upper-left corner of the upper-left macroblock. The filter output region 122 may be 16 by 16 pixels. An upper-left corner of the filter output region 122 may be located three pixels right of and nine pixels below the upper-left corner of the filter input region 120. In one example, each of the filter regions in a video frame may be filtered by a separate processor 110. Alternatively, multiple filter regions may be filtered using a single processor 110.

Figure 4:
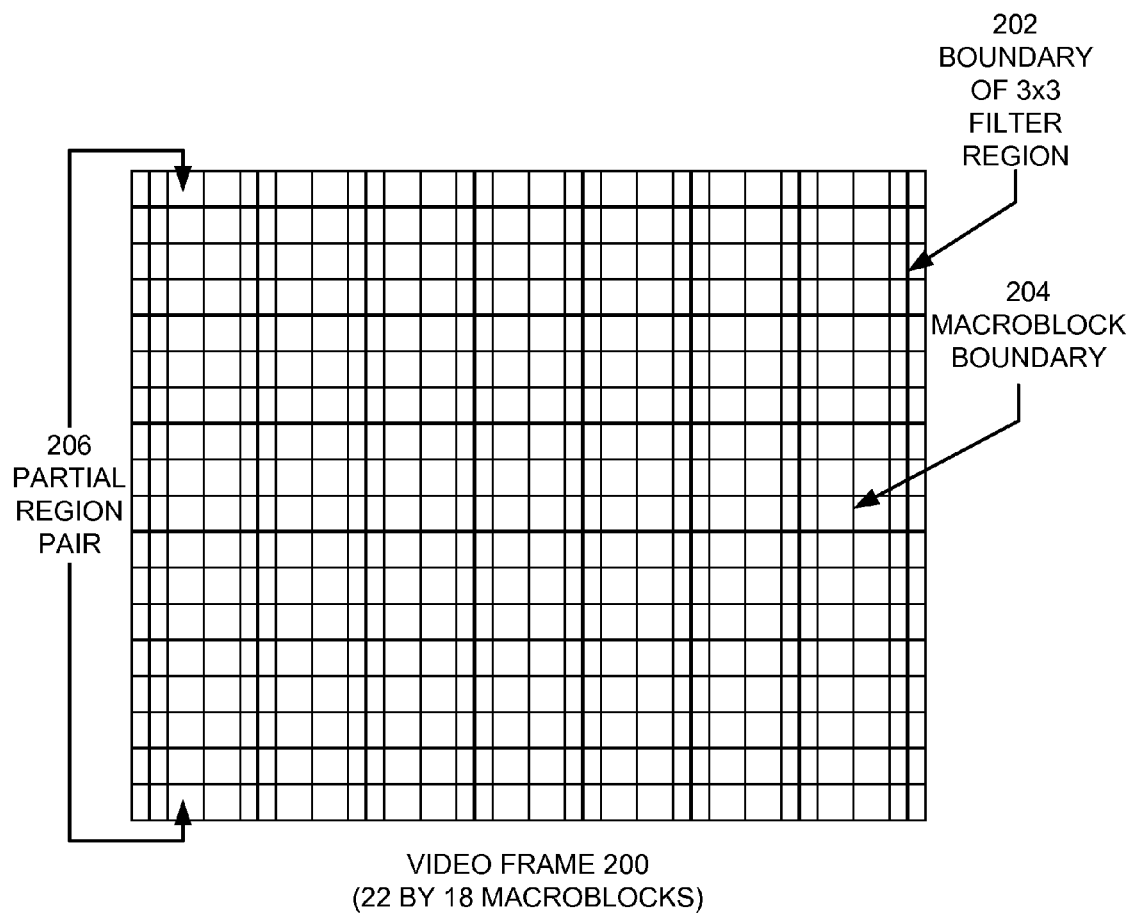
FIG. 4 is a diagram illustrating an arrangement of 3×3 filter regions in a video frame.

Referring to FIG. 4, a diagram is shown illustrating an example video frame 200 with filter regions arranged into 3 by 3 groups. Boundaries 202 of the 3 by 3 filter regions (indicated by thicker lines) generally do not align with the macroblock boundaries 204 or the boundaries of the video frame. Because the boundaries do not align, partial filter regions may occur at the edges of the video frame 200.

If separate processors are allocated to the partial regions, the processors generally have fewer pixels to filter and may be underutilized when compared to processors allocated to whole regions. The underutilization of the processors allocated to the partial regions may be rectified by assigning partial region pairs to the same processor to increase the pixels available for filtering. For example, a simple approach may be to form partial region pairs 206 by pairing partial regions from the top and bottom of the same column, or the left and right of the same row.

Figure 5:
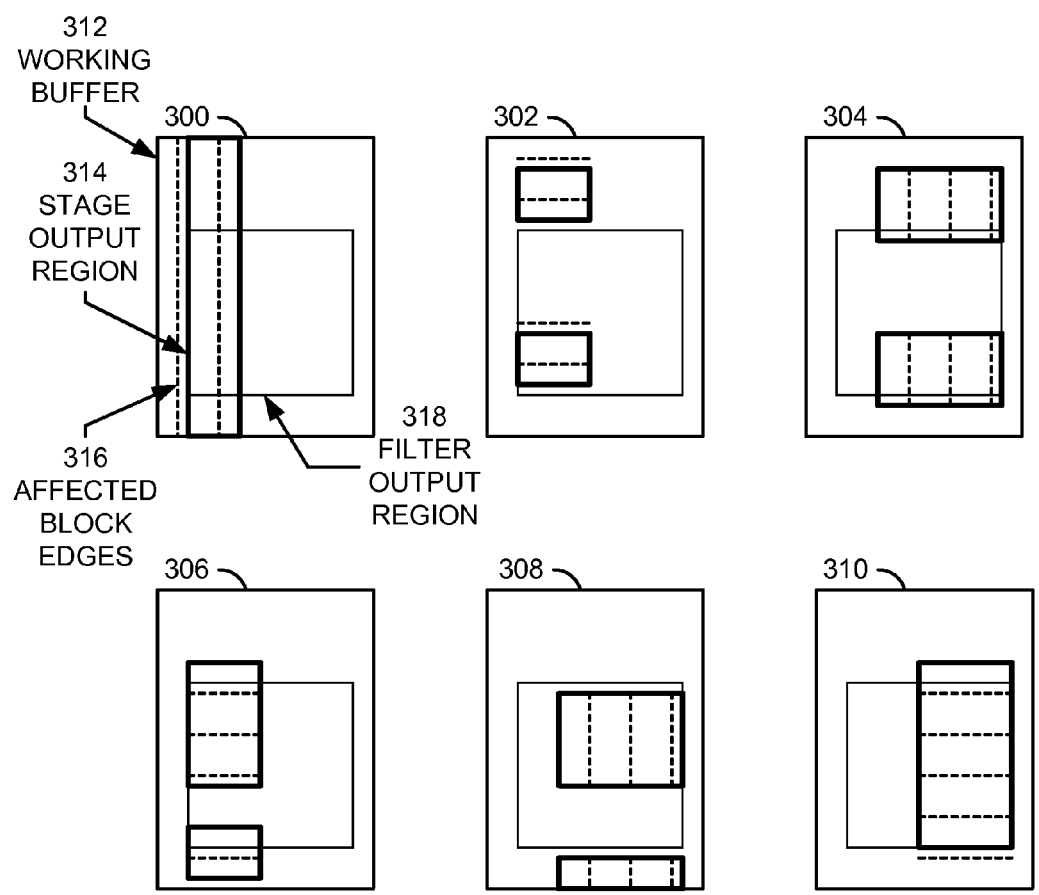
FIG. 5 is a diagram illustrating a number of filter processing steps in accordance with an example embodiment of the present invention.

Referring to FIG. 5, diagrams are shown illustrating a number of filter processing steps in accordance with an example embodiment of the present invention. The processing for each filter region in a video frame may be performed in a number of filtering steps or stages. In one example, six stages 300, 302, 304, 306, 308 and 310 may be implemented. The stages 300, ..., 310 may be used in sequence to process each filter region. Processing for each filter region in a video frame may be performed using a working buffer 312 having dimensions similar to the filter input region 120 (described in connection with FIG. 3). The working buffer 312 may be loaded initially with pixels from the input video frame buffer 106 at the beginning of filter processing. The order in which pixel values are computed within the working buffer 312 is generally important for the filter to generate output pixel values compliant with the MPEG-4 part 10 AVC specification. Each of the stages 300, ..., 310 reads pixel values from the working buffer 312, computes filtered pixel values based upon the pixel values read, and writes the filtered pixels back to a respective stage output region 314 of the working buffer 312.

The filtration of individual pixels may be performed according to the process described in section 8.7 of the MPEG-4 part 10 AVC specification. A general description of the filtering process may be as follows. Pixel values may be computed using an adaptive multi-tap filter applied at right angles to the edge being filtered. Up to 4 pixels on each side of the edge may be used as the filter input, and filtered values may be computed for up to three pixels on each side of the edge. The specific filter technique used may be determined based upon the type of edge being filtered (e.g., macroblock or transform block), the input pixel values and the prediction method and degree of quantization used to generate the input pixels. The respective stage output regions 314 for each of the stages 300, 310 are illustrated with thick borders. When processing of the particular filter region is complete, the pixels from a filter output region 318 of the working buffer 312 may be written out to the output video frame buffer 108.

The output pixels from a particular stage generally form the input pixels to the following stage. In some cases, pixels that lie outside the final filter output region 318 may be processed to generate intermediate results that may be used to compute the pixels within the filter output region 318. In one example, the stages 300, 304 and 308 may filter data across vertical macroblock/transform block edges, and the stages 302, 306 and 310 may filter data across horizontal edges. Dotted lines are shown in FIG. 5 to generally illustrate edges 316 that may influence the output pixel values for each step/stage.

Within each of the filtering stages, pixels are generally processed sequentially from left to right for vertical edges, and from top to bottom for horizontal edges. The filteration of individual pixels is generally compliant with section 8.7 of the MPEG-4 part 10 specification. For example, pixel values may be computed using an adaptive multi-tap filter applied at right angles to the edge being filtered. Up to 4 pixels on each side of the edge may be used as the filter input, and filtered values may be computed for up to three pixels on each side of the edge. The specific filter technique used may be determined based on the type of edge being filtered (e.g., macroblock or transform block), the input pixel values and the prediction method and degree of quantization use to generate the input pixels.

In one example, the location and size of the respective output regions 314 for each of the filtering stages 300, ..., 310 may be summarized as in the following TABLE 1:

TABLE 1

| Region | X | Y | Width | Height |
| --- | --- | --- | --- | --- |
| Stage 300 | 3 | 0 | 5 | 29 |
| Stage 302 Upper | 3 | 3 | 7 | 5 |
| Stage 302 Lower | 3 | 19 | 7 | 5 |
| Stage 304 Upper | 7 | 3 | 12 | 7 |
| Stage 304 Lower | 7 | 19 | 12 | 7 |
| Stage 306 Upper | 3 | 7 | 7 | 12 |
| Stage 306 Lower | 3 | 23 | 7 | 5 |
| Stage 308 Upper | 7 | 10 | 12 | 9 |
| Stage 308 Lower | 7 | 26 | 12 | 3 |
| Stage 310 | 10 | 7 | 9 | 18 |

All dimensions in TABLE 1 are in pixels. X and Y values represent the location of the upper-left corner of the particular region as measured from the upper-left corner of the working buffer (zero-based).

The method in accordance with embodiments of the present invention generally allows additional parallelism within each of the stages 300, ..., 310 when multiple processors or processors with single instruction/multiple data (SIMD) capability are used. For example, in the steps that filter across vertical edges (e.g., stages 300, 304 and 308), all rows of pixels may be processed at the same time. In the steps that filter across horizontal edges (e.g., stages 302, 306 and 310), all columns of pixels may be processed at the same time.

Figure 6:
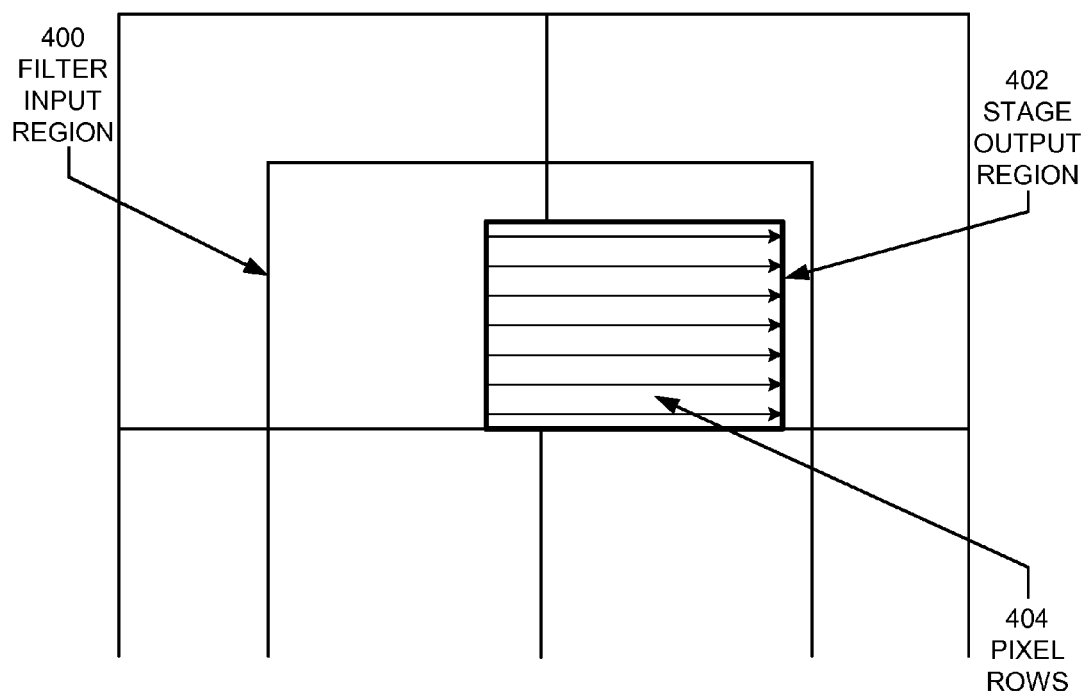
FIG. 6 is a diagram illustrating simultaneous filtering of pixel rows.

Referring to FIG. 6, a diagram is shown illustrating the level of parallelism for the case of the third filtering step 304 in FIG. 5. Rows of pixels 404 that may be processed simultaneously in the step 304 are shown within the stage output region 402 for the filtering step. The filter input region 400 is shown for reference.

As used herein, the terms "simultaneous" and "simultaneously" are meant to describe events that share some common time period, but the term is not meant to be limited to events that begin at the same point in time, end at the same point in time, or have the same duration.

The functions illustrated in the diagrams of FIGS. 5 and 6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the spirit and scope of the invention.

The invention claimed is:

1. A method for implementing a deblocking filter comprising the steps of:

reading pixel values for a plurality of macroblocks of an unfiltered video frame from an input buffer into a plurality of working buffers, wherein each working buffer has dimensions determined by a predefined input region of said deblocking filter and a portion of each working buffer forms a filter output region of said deblocking filter;

processing the pixel values in each of the plurality of working buffers in parallel using an array of software-configurable general purpose parallel processors, wherein for each of the plurality of working buffers:

sequentially processing the pixel values in said working buffer through a plurality of filter processing stages using the array of software-configurable general purpose parallel processors, wherein each of said plurality of filter processing stages computes filtered pixel values for one or more respective stage output regions of each filter processing stage by applying a predefined filter on a respective set of the pixel values in said working buffer, wherein a first filter processing stage of the plurality of filter processing stages computes filtered pixel values for the first stage output region of the first filter processing stage by applying said predefined filter using initial pixel values in said working buffer, wherein (i) a height of the first stage output region is equal to a height of said working buffer, (ii) a left edge of the first stage output region is aligned with a left edge of said filter output region of said working buffer, and (iii) a width of the first stage output region is less than a width of said filter output region of said working buffer; and writing the filtered pixel values from said filter output region of said working buffer to an output buffer after said plurality of filter processing stages are completed.

2. The method according to claim 1, wherein for each said working buffer of the plurality of working buffers, sequentially processing the pixel values in said working buffer through the plurality of filter processing stages using the array of software-configurable general purpose parallel processors comprises:

computing filtered pixel values for a second pair of stage output regions of a second filter processing stage by applying said predefined filter using (i) computed pixel values in a stage output region of a previous filter processing stage and (ii) initial pixel values in said working buffer, wherein (i) a left edge of each of the second stage output regions is aligned with a left edge of said filter output region of said working buffer, (ii) a width of the second stage output regions is less than a width of said filter output region of said working buffer, (iii) a lower one of the second stage output regions is located within said filter output region of said working buffer and (iv) an upper one of the second stage output regions is located above said filter output region of said working buffer.

3. The method according to claim 1, wherein for each said working buffer of the plurality of working buffers, sequentially processing the pixel values in said working buffer through the plurality of filter processing stages using the array of software-configurable general purpose parallel processors comprises:

computing filtered pixel values for a pair of third stage output regions of a third filter processing stage by applying said predefined filter using (i) computed pixel values in a first stage output region of a first previous filter processing stage, (ii) computed pixel values in a second pair of stage output regions of a second previous filter processing stage and (iii) initial pixel values in said working buffer, wherein (i) a right edge of each of the third stage output regions is aligned with a right edge of said filter output region of said working buffer, (ii) a width of the third stage output regions is less than a width of said filter output region of said working buffer, (iii) a lower one of the third stage output regions overlaps a lower edge of said filter output region of said working buffer and (iv) an upper one of the third stage output regions overlaps an upper edge of said filter output region of said working buffer.

4. The method according to claim 1, wherein for each said working buffer of the plurality of working buffers, sequentially processing the pixel values in said working buffer through the plurality of filter processing stages using the array of software-configurable general purpose parallel processors comprises:

computing filtered pixel values for a pair of fourth stage output regions of a fourth filter processing stage by applying said predefined filter using (i) computed pixel values in a first stage output region of a first previous filter processing stage, (ii) computed pixel values in a pair of second stage output regions of a second previous filter processing stage, (iii) computed pixel values in a pair of third stage output regions of a third previous filter processing stage and (iv) initial pixel values in said working buffer, wherein (i) a left edge of each of the fourth stage output regions is aligned with a left edge of said filter output region of said working buffer, (ii) a width of the fourth stage output regions is less than a width of said filter output region of said working buffer, (iii) a lower one of the fourth stage output regions overlaps a lower edge of said filter output region of said working buffer and (iv) an upper one of the fourth stage output regions overlaps an upper edge of said filter output region of said working buffer.

5. The method according to claim 1, wherein for each said working buffer of the plurality of working buffers, sequentially processing the pixel values in said working buffer through the plurality of filter processing stages using the array of software-configurable general purpose parallel processors comprises:

computing filtered pixel values for a second pair of stage output regions of a second filter processing stage by applying said predefined filter using (i) computed pixel values in a pair of stage output regions of a previous filter processing stage and (ii) initial pixel values in said working buffer, wherein (i) a right edge of each of the second stage output regions is aligned with a right edge of said filter output region of said working buffer, (ii) a width of the second stage output regions is less than a width of said filter output region of said working buffer, (iii) an upper one of the second stage output regions is located within said filter output region of said working buffer and (iv) a lower one of the second stage output regions is located below said filter output region of said working buffer.

6. The method according to claim 1, wherein for each said working buffer of the plurality of working buffers, sequentially processing the pixel values in said working buffer through the plurality of filter processing stages using the array of software-configurable general purpose parallel processors comprises:
computing filtered pixel values for a third output region of a third filter processing stage by applying said predefined filter using (i) computed pixel values in a pair of first stage output regions of a first previous filter processing stage and (ii) computed pixel values in an upper one of a pair of second stage output regions of a second previous filter processing stage, wherein (i) a height of the third stage output region is less than a height of said working buffer, (ii) a right edge of the third stage output region is aligned with a right edge of said filter output region of said working buffer, and (iii) a width of the third stage output region is less than a width of said filter output region of said working buffer.

7. The method according to claim 1, wherein said deblocking filter is MPEG-4 part 10 compliant and said filtered pixel values are computed using an adaptive multi-tap filter applied at right angles to edges being filtered.

8. The method according to claim 1, wherein:
said plurality of filter processing stages alternate between filtering across vertical edges and filtering across horizontal edges;
in the filter processing stages that filter across vertical edges, all rows of pixels are processed at the same time; and
in the filter processing steps that filter across horizontal edges, all columns of pixels are processed at the same time.

9. An apparatus comprising:
an input buffer storing unfiltered pixel values of a video frame;
an output buffer configured to store filtered pixel values for said video frame; and
an array of software-configurable general purpose parallel processors, each software-configurable general purpose parallel processor processing the unfiltered pixel values in each of a plurality of working buffers in parallel, wherein for each of the plurality of working buffers:
sequentially processing a number of pixel values in a respective working buffer through a plurality of filter processing stages, each of said plurality of filter processing stages computing filtered pixel values for one or more respective stage output regions of each filter processing stage by applying a predefined filter on a respective set of pixels in said working buffer, wherein each of the software-configurable general purpose parallel processors is configured to compute filtered pixel values for a first stage output region of a first filter processing stage by applying said predefined filter using initial pixel values in said working buffer, wherein (i) a height of the first stage output region is equal to a height of said working buffer, (ii) a left edge of the first stage output region is aligned with a left edge of a filter output region of said working buffer, and (iii) a width of the first stage output region is less than a width of said filter output region of said working buffer, and wherein initial pixel values in said working buffer are read from said input buffer prior to performing said plurality of filter processing stages and final filtered values in a predefined filter output region of said working buffer are written to said output buffer after said plurality of filter processing stages are completed.

10. The apparatus according to claim 9, wherein, for each working buffer of the plurality of working buffers, said array of software-configurable general purpose parallel processors is configured to:
compute filtered pixel values for a pair of second stage output regions of a second filter processing stage by applying said predefined filter using (i) computed pixel values in a stage output region of a previous filter processing stage and (ii) initial pixel values in said working buffer, wherein (i) a left edge of each of the second stage output regions is aligned with a left edge of said filter output region of said working buffer, (ii) a width of each of the second stage output regions is less than a width of said filter output region of said working buffer, (iii) a lower one of the second stage output regions is located within said filter output region of said working buffer and (iv) an upper one of the second stage output regions is located above said filter output region of said working buffer.

11. The apparatus according to claim 9, wherein, for each working buffer of the plurality of working buffers, said array of software-configurable general purpose parallel processors is configured to:
compute filtered pixel values for a pair of third stage output regions of a third filter processing stage by applying said predefined filter using (i) computed pixel values in a first stage output region of a first previous filter processing stage, (ii) computed pixel values in a second pair of stage output regions of a second previous filter processing stage and (iii) initial pixel values in said working buffer, wherein (i) a right edge of each of the third stage output regions is aligned with a right edge of said filter output region of said working buffer, (ii) a width of the third stage output regions is less than a width of said filter output region of said working buffer, (iii) a lower one of the third stage output regions overlaps a lower edge of said filter output region of said working buffer and (iv) an upper one of the third stage output regions overlaps an upper edge of said filter output region of said working buffer.

12. The apparatus according to claim 9, wherein, for each working buffer of the plurality of working buffers, said array of software-configurable general purpose parallel processors is configured to:
compute filtered pixel values for a pair of fourth stage output regions of a fourth filter processing stage by applying said predefined filter using (i) computed pixel values in a first stage output region of a first previous filter processing stage, (ii) computed pixel values in a pair of second stage output regions of a second previous filter processing stage, (iii) computed pixel values in a third pair of stage output regions of a third previous filter processing stage and (iv) initial pixel values in said working buffer, wherein (i) a left edge of each of the fourth stage output regions is aligned with a left edge of said filter output region of said working buffer, (ii) a width of the fourth stage output regions is less than a width of said filter output region of said working buffer, (iii) a lower one of the fourth stage output regions overlaps a lower edge of said filter output region of said working buffer and (iv) an upper one of the fourth stage output regions overlaps an upper edge of said filter output region of said working buffer.

13. The apparatus according to claim 9, wherein, for each working buffer of the plurality of working buffers, said array of software-configurable general purpose parallel processors is configured to:

compute filtered pixel values for a pair of second stage output regions of a second filter processing stage by applying said predefined filter using (i) computed pixel values in a pair of second stage output regions of a previous filter processing stage and (ii) initial pixel values in said working buffer, wherein (i) a right edge of each of the second stage output regions is aligned with a right edge of said filter output region of said working buffer, (ii) a width of the second stage output regions is less than a width of said filter output region of said working buffer, (iii) an upper one of the second stage output regions is located within said filter output region of said working buffer and (iv) a lower one of the second stage output regions is located below said filter output region of said working buffer.

14. The apparatus according to claim 9, wherein, for each working buffer of the plurality of working buffers, said array of software-configurable general purpose parallel processors is configured to:

compute filtered pixel values for a third stage output region of a third filter processing stage by applying said predefined filter using (i) computed pixel values in a pair of first stage output regions of a first previous filter processing stage and (ii) computed pixel values in an upper one of a pair of second stage output regions of a second previous filter processing stage, wherein (i) a height of the third stage output region is less than a height of said working buffer, (ii) a right edge of the third stage output region is aligned with a right edge of said filter output region of said working buffer, and (iii) a width of the third stage output region is less than a width of said filter output region of said working buffer.

15. The apparatus according to claim 9, wherein said plurality of filter processing stages form a MPEG-4 part 10 compliant deblocking filter and said filtered pixel values are computed using an adaptive multi-tap filter applied at right angles to edges being filtered.

16. The apparatus according to claim 9, wherein:

said plurality of filter processing stages alternate between filtering across vertical edges and filtering across horizontal edges;

in each of the filter processing stages that filter across vertical edges, all rows of pixels are processed at the same time by one or more of said array of software-configurable general purpose parallel processors; and in each of the filter processing stages that filter across horizontal edges, all columns of pixels are processed at the same time by one or more of said array of software-configurable general purpose parallel processors.

* * * * *